(12) United States Patent
Boshy et al.

(10) Patent No.: US 10,304,081 B1
(45) Date of Patent: May 28, 2019

(54) YIELDING CONTENT RECOMMENDATIONS BASED ON SERVING BY PROBABILISTIC GRADE PROPORTIONS

(71) Applicant: Outbrain Inc., New York, NY (US)

(72) Inventors: Shlomy Boshy, Nes Ziona (IL); Yatir Ben Shlomo, Kfar Saba (IL); Yaron Galai, New York, NY (US)

(73) Assignee: OUTBRAIN INC., New York, NY (US)

( * ) Notice: Subject to any disclaimer, the term of this patent is extended or adjusted under 35 U.S.C. 154(b) by 517 days.

(21) Appl. No.: 13/956,865

(22) Filed: Aug. 1, 2013

(51) Int. Cl.
*G06Q 30/02* (2012.01)

(52) U.S. Cl.
CPC ..... *G06Q 30/0246* (2013.01); *G06Q 30/0254* (2013.01)

(58) Field of Classification Search
None
See application file for complete search history.

(56) References Cited

U.S. PATENT DOCUMENTS

| | | | | |
|---|---|---|---|---|
| 2007/0027744 A1* | 2/2007 | Carson | G06F 17/2785 | 725/36 |
| 2008/0275775 A1* | 11/2008 | Gonen | G06Q 30/02 | 705/14.71 |
| 2009/0043597 A1* | 2/2009 | Agarwal | G06Q 30/0207 | 705/14.1 |
| 2009/0070334 A1* | 3/2009 | Callahan | G06F 21/604 | |
| 2010/0010891 A1* | 1/2010 | Langford | G06Q 30/02 | 705/14.46 |
| 2010/0169175 A1* | 7/2010 | Koran | G06F 17/30867 | 705/14.45 |
| 2010/0198695 A1* | 8/2010 | Muthukrishnan | G06Q 30/02 | 705/14.71 |
| 2011/0023129 A1* | 1/2011 | Vernal | G06F 21/6245 | 726/28 |
| 2011/0196747 A1* | 8/2011 | Karidi | G06Q 30/0275 | 705/14.71 |
| 2011/0258049 A1* | 10/2011 | Ramer | G06F 17/30867 | 705/14.66 |
| 2012/0016642 A1* | 1/2012 | Li | G06Q 30/02 | 703/2 |
| 2012/0030012 A1* | 2/2012 | Fisher | G06Q 30/0241 | 705/14.46 |

(Continued)

OTHER PUBLICATIONS

Li, W, et al. Exploitation and Exploration in a Performance based Contextual Advertising System. KDD'10, Jul. 25-28, 2010 [retrieved May 6, 2016]. Retrieved from Google Scholar: <URL: http://www.cs.cmu.edu/~xuerui/papers/ee.pdf>.*

(Continued)

*Primary Examiner* — Michael W Schmucker
*Assistant Examiner* — Bion A Shelden
(74) *Attorney, Agent, or Firm* — Lowenstein Sandler LLP

(57) ABSTRACT

A server computer system identifies a user and a destination document. The server computer system identifies recommendations that correspond to the user and the destination document. The server computer system determines grades for the recommendations based on the user and/or the destination document. The server computer system determines serving probabilities for the recommendations based on the proportions of the grades and provides the serving probabilities to serve the recommendations.

11 Claims, 7 Drawing Sheets

(56) References Cited

U.S. PATENT DOCUMENTS

| | | | |
|---|---|---|---|
| 2013/0030907 A1* | 1/2013 | Lyon | G06Q 30/0277 |
| | | | 705/14.42 |
| 2015/0006280 A1* | 1/2015 | Ruiz | G06Q 30/00 |
| | | | 705/14.45 |
| 2015/0095271 A1* | 4/2015 | Ioannidis | G06Q 30/02 |
| | | | 706/12 |

OTHER PUBLICATIONS

Lu, T, et al. Contextual Multi-Armed Bandits. AISTATS 2010 [retrieved May 6, 2016]. Retrieved from Google Scholar: <URL:http://machinelearning.wustl.edu/mlpapers/paper_files/AISTATS2010_LuPP10.pdf>.*

* cited by examiner

| Group | Recommendation | CTR | CPC |
|---|---|---|---|
| Non-Exploration Group (409) | Recommendation-1 421 | 2% | 0.08 |
| | Recommendation-2 423 | 5% | 0.02 |
| | Recommendation-3 425 | 8% | 0.01 |
| | Recommendation-4 427 | 10% | 0.03 |
| Exploration Group (411) | Recommendation-5 429 | Unknown | 0.05 |
| | Recommendation-6 431 | Unknown | 0.04 |

413

| Group | Recommendation | CTR | CPC |
|---|---|---|---|
| Non-Exploration Group | Recommendation-1 421 | 2% | 0.08 |
| | Recommendation-2 423 | 5% | 0.02 |
| | Recommendation-3 425 | 8% | 0.01 |
| | Recommendation-4 427 | 10% | 0.03 |
| Exploration Group | Recommendation-5 429 | 2% | 0.05 |
| | Recommendation-6 431 | 3% | 0.04 |

| Group % | Recommendation | CTR | CPC | RPM = CTR × CPC | Grade = RPM | Serving Probability = Grade normalized by Group % |
|---|---|---|---|---|---|---|
| 90% (Non-Exploitation Group) 605 | Recommendation-1 613 | 2% | 0.08 | 0.0016 | $(0.0016)^4$ | 0.06629 |
| | Recommendation-2 615 | 5% | 0.02 | 0.0010 | $(0.0010)^4$ | 0.01011 |
| | Recommendation-3 617 | 8% | 0.01 | 0.0008 | $(0.0008)^4$ | 0.00414 |
| | Recommendation-4 619 | 10% | 0.03 | 0.0030 | $(0.0030)^4$ | 0.81943 |
| 10% (Exploration Group) 609 | Recommendation-5 621 | 2% | 0.05 | 0.0010 | $(0.0010)^4$ | 0.03333 |
| | Recommendation-6 623 | 3% | 0.04 | 0.0012 | $(0.0012)^4$ | 0.06666 |

FIG. 6

YIELDING CONTENT RECOMMENDATIONS BASED ON SERVING BY PROBABILISTIC GRADE PROPORTIONS

TECHNICAL FIELD

The present disclosure relates to content recommendations and, more particularly, to a technique of yielding content recommendations based on serving by probabilistic grade proportions.

BACKGROUND

In the web advertising industry, the onus of revenue-generating activity is shifting from selling interruptive advertisements to providing integrated high-quality content that is interesting and helpful to readers. The online advertisement industry has not kept pace with this paradigm shift, and digital solutions that natively support content marketing are lacking. Traditionally, content providers place bids to have their content placed as recommendations on various websites. In general, bidding platforms promise to allocate content to the highest bidder on an impression-by-impression basis regardless of the likelihood that the content may or may not be selected by user and can result in recommendations that may not be of interest to users. Some conventional bidding platforms typically serve the content of the highest bidder in multiple locations, which may result in a lack of variety of content that is being served. Some systems may attempt to address the problem of ensuring variety by dividing the allocation space. For example, some solutions may assign different search words to different winning buyers. Such solutions place constraints on the content providers to know beforehand which search terms they should use and restrict the serving of content to a binary decision of being served or not being served.

BRIEF DESCRIPTION OF THE DRAWINGS

The present disclosure will be understood more fully from the detailed description given below and from the accompanying drawings of various implementations of the disclosure.

FIG. 4 illustrates an example of determining CTR (click-through-rate) for recommendations, according to various implementations.

FIG. 6 illustrates an example of determining serving probabilities for recommendations, according to various implementations.

DETAILED DESCRIPTION

Figure 1:
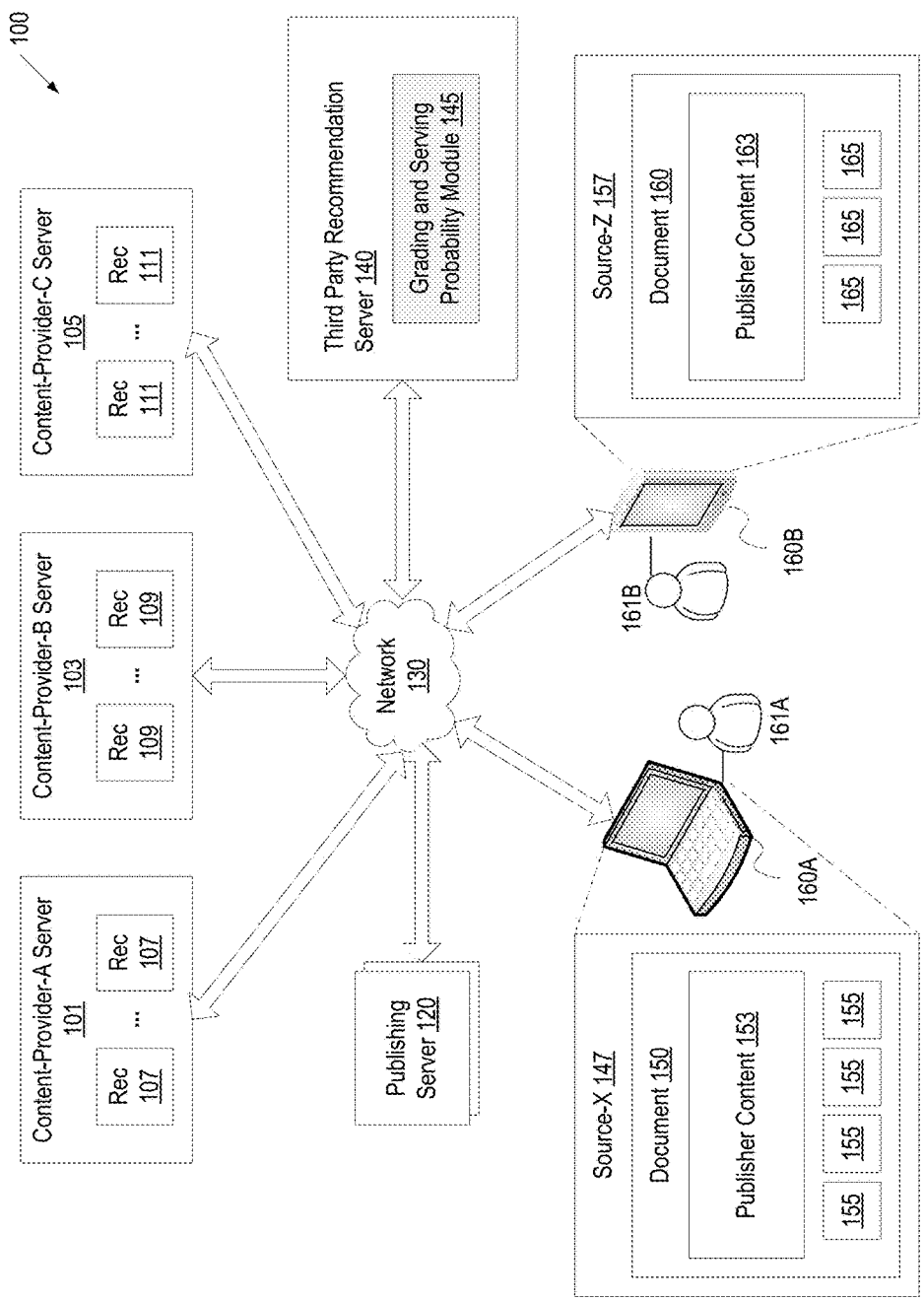
FIG. 1 illustrates an example system architecture in which examples of the present disclosure can be implemented.

A system and method for yielding content recommendations based on serving by probabilistic grade proportions is described, according to various implementations. Content providers may wish to have their content distributed as recommendations on various destination documents. A content recommendation or recommendation hereinafter refers to a representation of digital content. A recommendation can include one or more text, links, thumbnails, images, icons, etc. A document hereinafter refers to webpage, a mobile application graphical user interface (GUI), etc. For example, a web blogger, John Smith, may wish to have his web blog post of his analysis of a baseball game to be included as a recommendation for users that are accessing a SportsNews webpage describing the highlights of the same baseball game. An impression hereinafter refers to populating a destination document (e.g., webpage, mobile application GUI) with a content recommendation. For example, the web blog post of John Smith may be an impression if the web blog post is served as a recommendation on the SportsNews webpage.

The content provider (e.g., web blogger John Smith) may use a third party recommendation service provider to serve his content to various destination documents. The content provider can specify to the third party recommendation server a budget and/or a cost-per-click (CPC) the content provider is willing to pay for the service. "Content provider" is hereinafter also referred to as "buyer." The CPC is the amount the buyer is willing to pay each time a content recommendation is selected. For example, the content provider may have a maximum budget of $800 and may be willing to pay a maximum CPC of $1.

Implementations of the present disclosure use a probabilistic approach to enable a variety of content recommendations to be served as impressions. Implementations of the present disclosure determine grades for the content recommendations and determine the probability that the recommendations may be served proportional to the grades of the recommendations to provide content providers control of the tradeoff between high revenue and variety of content. Implementations of the present disclosure serve recommendations independent of user selected keywords and provide content providers dynamic flexibility in specifying the type of recommendations to serve as impressions. For example, a content provider may wish to have more high revenue producing recommendations to be served. In another example, the content provider may wish to have a wide variety of recommendations, and not necessarily the highest revenue producing content, to be served. With digital content (e.g., news, articles, blogs, social media posts, data feeds, etc.) changing at a fast rate, implementations of the present disclosure can ensure that a minimum amount of new recommendations are to be served. Implementations of the present disclosure automatically and dynamically provide a balance between variety and monetization.

Unlike traditional solutions, implementations of the present disclosure do not have a single "winning" recommendation that is always to be displayed in the destination documents. Implementations of the present disclosure distribute impressions in a probabilistic manner, such that the impressions of the recommendations are proportional by some function to the grades of the recommendations. Implementations of the present disclosure provide a continuum of impressions that allow buyers to set a particular budget percentage and an accurate estimate of costs involved.

FIG. 1 illustrates an example system architecture 100 in which examples of the present disclosure can be implemented. The system architecture 100 can include one or more user devices 160A-B, one or more content provider servers 101,103,105, one or more destination servers (e.g., publishing servers 120) and one or more third party recommendation servers 140 coupled to each other over one or more networks 130.

Content providers may have recommendations (e.g., recommendations 107,109,111) they wish to have displayed, for example, in a publisher document (e.g., document 150, 160). A document 150,160 may be for example, and is not limited to a website homepage, section front, webpage, mobile application user interface (UI), gaming application UI, television application UI, etc. For example, content provider web blogger John Smith may have multiple recommendations 107 of web blog posts and may wish to have the recommendations 107 served in document 150 (e.g., SportsNews webpage) and/or document 160 (e.g., BaseballNews website). A recommendation 107,109,111 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc. Each content provider can have multiple recommendations 107,109,111.

A content recommendation host or "publisher" hereinafter refers to an entity and platform hosting destination documents (e.g., webpages, mobile application graphical user interfaces (GUIs), gaming application GUIs, television application GUIs, etc.) that include recommendations 107, 109,111 of the content providers. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers.

The publishers' destination documents 150,160 can be rendered with the recommendations 107,109,111 of the content providers in user devices 160A-B using for example, an application (e.g., web browser, mobile application, desktop application, gaming application, television application, etc.) on the user device 160A-B.

A document 150,160 can be within a source 147,157. The source 147,157 can be for example, and is not limited to, a publisher's website, a publisher's mobile application, publisher's gaming application, publisher's television application, etc. A destination document 150,160 can include publisher content (e.g., publisher content 153,163). For example, the SportsNews website (e.g., source 147) can include a webpage (e.g., document 150) that contains an article about a baseball game (e.g., publisher content 153).

The publisher destination documents 150,160 can be configured with one or more recommendation opportunities 155,165, which can be populated with recommendations 107,109,111. For example, a document 150 (e.g., SportsNews webpage) may have four recommendation opportunities 155 and a document 160 (e.g. BaseballNews mobile application GUI) may have three recommendation opportunities 165. The recommendation opportunities 155,165 may be populated with recommendations 107,109,111 from one or more content providers' servers 101,103,105.

The content providers may wish to publish their respective recommendations 107,109,111 in widespread locations (e.g., document 150, document 160). The content providers can use the service hosted by the third party recommendation service provider to have the recommendations 107,109, 111 of the content providers served to populate the recommendation opportunities 155,165 in the publisher documents 150,160. The publishers (e.g., SportsNews Inc., BaseballNews, Inc.) can use the service hosted by the third party recommendation service provider to receive recommendations 107,109,111 to populate the recommendation opportunities 155,165 in their respective publisher documents 150,160.

The third party recommendation service provider can host one or more third party recommendation servers 140 to provide the service to the content providers and publishers. The server 140 can include a grading and serving probability module 145 to optimize the placement of the content provider recommendations 107,109,111 in the recommendation opportunities 155,165 in the documents 150,160 where they are most likely to be selected by users 161A-B and provide high user-engagement while generating click-through revenue. The publishers (e.g., SportsNews Inc., BaseballNews, Inc.) may wish to include impressions in their respective documents 150,160 that are of sufficiently high quality while providing a substantial income stream.

The grading and serving probability module 145 can use a probabilistic approach to grading the recommendations 107,109,111 and selecting the recommendations 107,109, 111 to be served which meet the criteria of the content providers and publishers. The grading and serving probability module 145 can select the recommendations 107,109,111 that provide the most valued content while still providing substantial revenue and increasing user-engagement.

The network of content providers can include, for example, several hundred thousand recommendations 107, 109,111 that may be stored in one or more data stores that are coupled to the network 130. The architecture 100 can include, for example, several hundred publisher documents 150,160 that are accessed by multiple users 161A-B on various user devices 160A-B.

When a particular user (e.g., user 161A) accesses a particular document (e.g., document 150), the grading and serving probability module 145 can determine which set of recommendations 107,109,111 should be served as impressions to populate the four recommendation opportunities 155 in the document 150. As each user 161A-B accesses a document 150,160, the grading and serving probability module 145 can determine which set of recommendations 107,109,111 should be served for the particular user/document combination. Evaluation of each of the several hundred thousand recommendations 107,109,111 may be time consuming and may use a significant amount of computing resources. The grading and serving probability module 145 can use fetching algorithms and filtering rules to identify a subset of the recommendations 107,109,111 as appropriate recommendations for a particular user/document combination.

The grading and serving probability module 145 uses a probabilistic grading system to enforce and allow the creation of a variety of impressions in documents 150,160 so as to avoid serving the same recommendations 107,109,111 every time. The grading and serving probability module 145 allows control over the balance between monetization and variety in serving impressions. The grading and serving probability module 145 can enforce variety at various levels. For example, the grading and serving probability module 145 can maintain variety at the document level, for example, by not serving the same recommendation repeatedly. In another example, the grading and serving probability module 145 can maintain variety at the campaign level, for example, by running multiple campaigns and not just a single campaign every time. The grading and serving probability module 145 can automatically determine, without user input of search terms, the topic areas that maximize user engagement and optimize the campaign serving.

The grading and serving probability module 145 can divide the user requests for a particular document 150,160 in a probabilistic manner between the recommendations 107, 109,111 of the various content providers such that the likelihood of a recommendation being served as an impression is in proportion to its grade. The grade can be based on CPC (cost-per-click), CTR (click-through-rate), users interests, destination location, etc. The CTR can be the estimated probability that a user 161A-B will select the recommendation if the recommendation populates a destination document. The grade can be a representation of the average revenue associated with a recommendation.

The content providers may purchase campaigns from the third party recommendation service provider. The campaigns provide recommendations 107,109,111 from the content providers to one or more destination documents 150,160 in accordance with criteria selected by the content provider and parameters of the documents 150,160 set by the publishers. The destination documents 150,160 may have parameters defining the scope of which recommendations 107,109,111 may be included in the destination documents 150,160. For example, the parameters can include, and are not limited to, category (e.g., news), sub-category (e.g., international news), country, platform, language, etc.

The content providers may specify parameters for the campaign, such as, and not limited to, a maximum budget (B) of what the content provider is willing to pay for the campaign and a maximum cost-per-click (CPC) that the content provider is willing to pay each time users (e.g., users 161A,B) select a recommendation.

The grading and serving probability module 145 can determine the CTR (click-through-rate) for the recommendations 107,109,111. The CTR is the estimated probability (percentage) that a user 161A-B will select the recommendation if the recommendation populates a recommendation opportunity in a destination document. The CTR can be determined from user activity data that is stored in one or more data stores that a coupled to the network 130. One implementation of determining the CTR for the recommendations is described in greater detail below in conjunction with FIG. 3. The data stores can be persistent storage units coupled to the network 130. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The grading and serving probability module 145 can determine grades for the recommendations (e.g., recommendations 107,109,111) using the CPCs and CTRs for the recommendations, and can determine the serving probabilities for the recommendations 107,109,111 based on the proportions of the grades. One implementation of determining the grades for the recommendations is described in greater detail below in conjunction with FIG. 3. One implementation of determining the serving probabilities for the recommendations is described in greater detail below in conjunction with FIG. 5. The server 140 can use the serving probabilities to serve the recommendations 107,109,111 to various destination documents 150,160.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a personal digital assistant, a server computer, a handheld device or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. For example, user device 160A may be a laptop computer and user device 160B may be a tablet computer.

Figure 2:
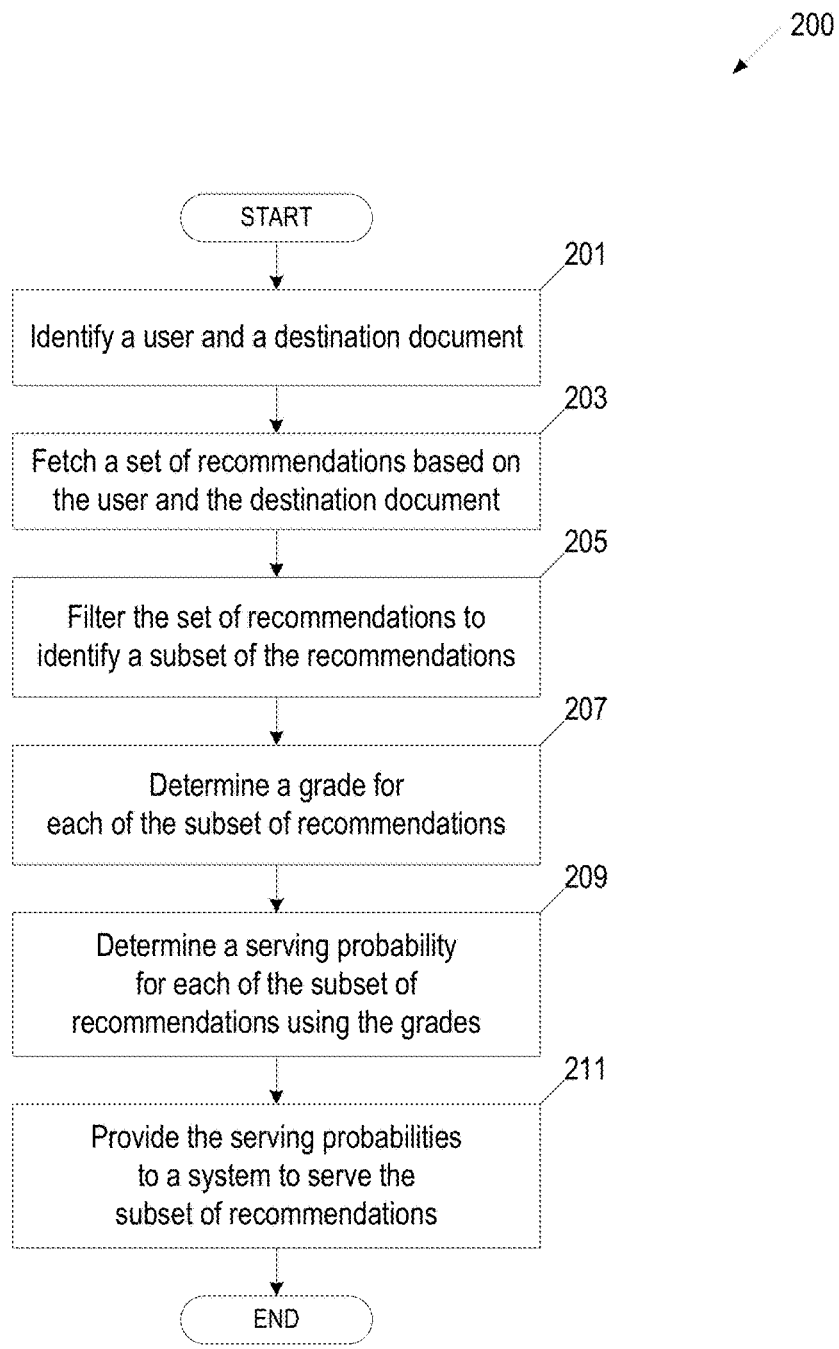
FIG. 2 is flow diagram of an implementation of a method for yielding content recommendations based on serving by grade proportions.

FIG. 2 is flow diagram of an implementation of a method 200 for yielding content recommendations based on serving by grade proportions. The method may be performed by processing logic that may comprise hardware (circuitry, dedicated logic, etc.), software (such as is run on a general purpose computer system or a dedicated machine), or a combination of both. In one implementation, the method 200 may be performed by the grading and serving probability module 145 hosted in a server 140 of FIG. 1.

At block 201, the server identifies a user and a destination document (e.g. web page, mobile application UI, gaming application UI, television application UI, etc.). For example, a user (e.g., User-Z) may open a webpage (e.g., Document-X) from a source Sportsnews.com. The server may receive a unique identifier that uniquely identifies the user and a document identifier that uniquely identifies the destination document. For example, the document identifier may be a URL (uniform resource locator).

At block 203, the server fetches a set of recommendations based on the user and the destination document. The server can use one or more fetching algorithms, such as, and not limited to, a contextual fetching algorithm, a behavioral fetching algorithm, a personal fetching algorithm, a social fetching algorithm, etc. The server may be coupled to one or more data stores that store, for example, several hundred thousand, recommendations. The server can use one or more fetching algorithms to identify a smaller set of the recommendations which may be used for populating the recommendation opportunities in the destination document. For example, the server can use a contextual fetching algorithm to fetch a subset of recommendations based on the context of the destination document (e.g., Document-X). For example, if Document-X contains content about economics, the server can identify a subset of recommendations that are associated with economics. In another example, the server can use a behavioral fetching algorithm to fetch a subset of recommendations based on the behavior of the user (e.g., User-Z) requesting Document-X.

The server can be coupled to one or more data stores that store user activity data. The server may collect account information, personal information, and/or demographic information pertaining to groups of users (e.g., age of user groups, geography (e.g., country, state, city) of user groups) and may store the information in one or more data stores (e.g., hard disks, memories, databases, etc.). In situations in which the implementations discussed herein collect personal information and/or demographic about users, or may make use of personal information and/or demographic information, the user may be provided with an opportunity to control whether the grading and serving probability module is allowed collect the information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. Thus, the user may have control over how, when, and what type of information is collected about the user and used by the grading and serving probability module.

For example, the server may use data indicating that a group of users, which access recommendations pertaining to sports, also access recommendations that pertain to cars. The server can use the content in the destination document (e.g., Document-X) to fetch recommendations that are associated with the destination document based on the behavior of users that access the destination document. For example, if Document-X pertains to sports the server can fetch recommendations that pertain to cars.

In one implementation, the server can execute a portion of the fetching (e.g., contextual fetching, behavioral fetching) algorithms offline. For example, the server may process the data for the recommendations to determine groups of recommendations based on context and/or behavior in an offline mode. Subsequently, when the server identifies a particular user that is accessing a particular destination document in real-time, the server may determine which of one or more groups the user and/or destination document belong to.

At block 205, the server filters the set of recommendations to identify a subset of the recommendations. Not all recommendations can appear in every destination document. The recommendations may have constraints. The constraints may be specified by the content providers, for example, as campaign parameters. For example, Content-Provider-A may specify that Recommendation-A to Recommendation-n are for users in Chicago, Ill., USA. Examples of campaign parameters can include, and are not limited to, geography, device platform, language, user group characteristics, etc. The campaign parameters for a particular campaign can be stored in one or more data stores that are coupled to the server. The data stores can store campaign parameters for multiple campaigns and multiple content providers.

The publisher documents (e.g., Document-X) may have constraints that are specified by the publishers as document parameters. The server can use the document identifier to identify the publisher parameters for the destination document. The document parameters for a particular document can be stored in one or more data stores that are coupled to the server. The data stores can store mapping data that maps the document identifiers to the corresponding document parameters. The data stores can store documents parameters for multiple documents.

The server can use one or more filtering rules that are stored in the data store to identify a subset of recommendations from the set of recommendation that have campaign parameters that satisfy the filtering rules and the document parameters. For example, Document-X may have four recommendation opportunities, may be for a mobile platform, may be configured for the English language, etc. The server can filter out the recommendations that do not satisfy the publisher parameters for Document-X. For example, the server can filter out recommendation candidates that are not for a mobile platform or are not for the English language.

In another example, one or more publishers may block certain campaign parameters. For example, International News, Inc. may block content recommendations from campaigns related to Global News, Inc. If the destination document is for publisher International News, Inc., the server can filter out recommendations that are associated with Global News, Inc. The server can parse the recommendations using a set of filtering rules that determine whether a recommendation can or cannot populate a recommendation opportunity for the particular destination document (e.g., Document-X) for the user (e.g., User-Z). The filtering rules can include one or more logical constraints. Examples of a logical constraint can include, and are not limited to, not showing two recommendations with the same titles, not showing the same recommendations to users who have already selected the recommendations, etc.

At block 207, the server determines a grade for each of the subset of recommendations. The server can determine the grade for each recommendation in a probabilistic manner. The server can determine the grades as a function of the CPC and the CTR for the corresponding recommendation. The CTR can be based on one or more factors, that include, for example, and are not limited to, the destination document, the user, etc. One implementation for determining the grade for each recommendation in the filtered set of recommendations is described in greater detail below in conjunction with FIG. 3.

At block 209, the server determines a serving probability for each of the subset of recommendations. The server can determine the serving probabilities by grouping the recommendations as either non-exploration recommendations or exploration recommendations, and by using the percentages of the groups to normalize the grades to create the serving probabilities for the recommendations. One implementation for determining the serving probability for each recommendation in the filtered set of recommendations is described in greater detail below in conjunction with FIG. 5.

At block 211, the server provides the serving probabilities to a system to serve the subset of recommendations. For example, the server can provide the serving probabilities to a serving system, which can select the recommendations to populate the destination document based on the serving probabilities. The serving probabilities can take into account variety and monetization for the content providers. The server and/or another system (e.g., distribution server) can select a set of N recommendations to include in a destination document. In one implementation, the recommendations are selected from highest serving probability to lowest. In one implementation, one recommendation is selected after another recommendation until recommendations cannot be selected. For example, the selections may be subject to one or more constraints. For example, no more than X % of the recommendations served in one destination document to the user should be from the same content provider, and the server may select a first recommendation to serve and may filter out other recommendation from the same content provider based on the constraint.

Figure 3:
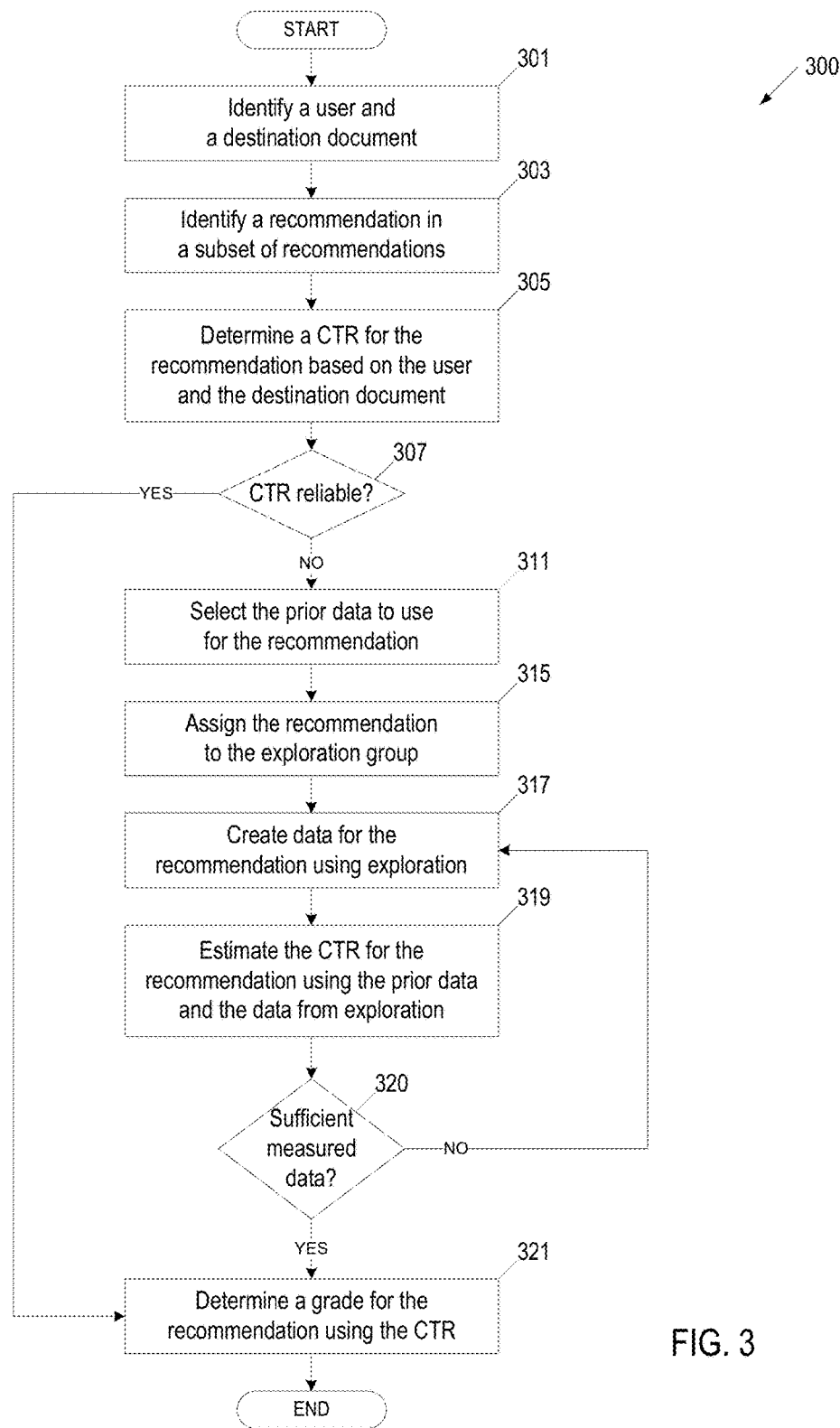
FIG. 3 is flow diagram of an implementation of a method for determining grades for recommendations.

FIG. 3 is flow diagram of an implementation of a method 300 for determining grades for recommendations. The method may be performed by processing logic that may comprise hardware (circuitry, dedicated logic, etc.), software (such as is run on a general purpose computer system or a dedicated machine), or a combination of both. In one implementation, the method 300 may be performed by the grading and serving probability module 145 hosted in a server 140 of FIG. 1.

Method 300 and/or at least portions of method 300 may be iterative. The number of iterations can be based on the number of recommendations to determine a grade for. The server can determine the grades for the recommendations based on one or more factors, which include, for example, and are not limited to, the CPC of the recommendation, the CTR of the recommendation, the destination document, the user, recommendation business related boosts for campaign promotion, and/or other user engagement measures that indicate the quality of the recommendation (e.g., user session length after user interaction with the system (e.g., selection via a user input via an input device), measured in number of page views or session time, user behavioral measures, such as consumption time of document, user browsing, etc.). The grade can indicate the expected value of the revenue. In one implementation, the grade is calculated as the probability that the user will select the recommendation multiplied by how much revenue the third party recommendation service provider will earn provided the user selects the recommendation.

At block 301, the server identifies a user and a destination document. For example, a user may open a destination document (e.g., webpage), and the server may receive a unique identifier that uniquely identifies the user and a document identifier that uniquely identifies the destination document. At block 303, the server identifies a recommendation that is in a subset of recommendations. The subset of recommendations can represent recommendations that satisfy one or more fetching algorithms (e.g., contextual, behavioral, personal) and one or more filtering rules for the destination document.

At block 305, the server determines a CTR for the recommendation based on the destination document and user. In one implementation, the CTR is the estimated probability that a user will select the recommendation if the recommendation populates a recommendation opportunity in the destination document. In another implementation, the CTR is the percentage of users that are selecting an impression of a particular recommendation in a particular destination document.

Each recommendation may have a different CTR depending on its destination location (e.g., document, source, etc.). For example, Recommendation-1 may have CTR-A if Recommendation-1 is on a webpage displaying a Sports article, and Recommendation-1 may have CTR-B if Recommendation-1 is on a webpage displaying an Arts article. The CTR may be based on the most specific location, such as a document, that has the most reliable data, or may be based on data at a broader level (e.g., source, category, network, etc.).

In another example, each recommendation might have a different CTR depending on the user that is consuming the destination document. For example, Recommendation-1 may have CTR-C if the user has an interest in museums, and Recommendation-1 may have CTR-D if the user has an interest in sports cars. The server may personalize the recommendation by using a "personalized CTR" gathered by clustering the user into a group of users with similar behavior, and determining the CTR of a recommendation for the group of users. The personalized CTR can be used to determine the grade when there is a sufficient amount of user data. The server can be coupled to a data store that stores configuration data to define a threshold of a number of user experiences to define a sufficient amount of data.

The CTR for a recommendation can be determined for one or more levels of data (e.g., recommendation, document, source, and network). The server can determine the CTR using the most detailed data or a combination of different data levels based on reliability of the data. For example, the server may use data from one or more groups of users that have accessed the same recommendation as the user to determine the CTR for the recommendation. In one implementation, the server can determine an average or median CTR from the data from the groups and can use the average or median as the CTR for the recommendation.

When the server determines the CTR for the recommendation, if there does not exist sufficient statistical information for the recommendation, the server may use data from a broader level, such as the document level, to determine the CTR. For example, there may not be sufficient data of other users, which are similar to the user based on the user's interests, accessing the same recommendation as the user, and the server may determine the CTR for the recommendation at the document level. The server can determine the CTR using data for the document (e.g., URL) in which the recommendation appeared. The server may use data from groups of users that have accessed the same document (e.g., webpage, mobile application document, etc.) as the user to determine the CTR for the recommendation. For example, the recommendation may be in a document, such as a webpage displaying an article about a recent baseball game, and the server can use data relating to groups of users that have accessed the same webpage.

In another example of a broader level, the server can determine the CTR for the recommendation at the category level. For example, the server can use data for a set of documents in the same category as the current document in the current source to determine the CTR for the recommendation. In another example of a broader level, the server may determine the CTR for the recommendation at the source level. The server may use data from groups of users that have accessed the same source (e.g., website, mobile application, etc.) as the user to determine the CTR for the recommendation. The source generally shares a common topic or theme with the initial destination document, which can result in a greater likelihood that CTR predictions based on a wider location category, such as the source, are appropriate for the initial destination document.

In another example of a broader level, the server can determine the CTR for the recommendation using data pertaining to the set of documents in the same category as the current document in the all of the serving network. In another example of a broader level, the server can determine the CTR for the recommendation using data pertaining to all of serving network. At block 307, the server determines whether the CTR for the recommendation is reliable. There may be recommendations that do not have sufficiently reliable data for determining the CTR, which may result in a CTR that is not reliable. For example, a new content recommendation may be recently added to the system and may not have yet been served or has been served very little. The server can consider the CTR as reliable if there is enough statistical data to predict the CTR of the recommendation for the destination document. The configuration data in the data store can specify a threshold of a number of user experiences for determining whether there is enough statistical data.

If the CTR is not reliable for the recommendation (block 307), the server selects prior data to use for the recommendation at block 311. Examples of prior data can include, and are not limited to, data for the recommendation for a different level of data (e.g., network, source, category, etc.) that is associated with the destination document, data for the recommendation for other destination documents, data for other recommendations for the same destination document, etc. In one implementation, the server selects the prior data for the most detailed level first. For example, the server may select the prior data at the document level first. In another example, the server can select prior data based on the recommendation's performance in other locations, such as broader levels (e.g., source, category, etc.).

At block 315, the server assigns the recommendation to the exploration group at block 315. The exploration group is a group of recommendations that may be newly added to the recommendation system. At block 317, the server creates data for the recommendation using exploration. Exploration can include serving the recommendation for a time period and/or for a number of servings in a set of locations (e.g., documents, positions, sources, categories, sections, etc.) to create data relating to the recommendation's performance on the different locations. The configuration data can specify the period of time and/or the number of servings that the server should use. In one implementation, the server performs exploration by using a prior understanding of where similar recommendations performed well. For example, the recommendation may be related to politics. Prior data may indicate that recommendations about politics generally perform well in business sources, and the server can serve the recommendation in business sources.

At block 319, the server estimates the CTR for the recommendation using a combination of the prior data and the data that is created from exploration. In one implementation, the server starts with a prior CTR. The server can calculate a prior CTR using a regression model based on past behavior of similar recommendations in similar locations. In one implementation, the server can determine median CTR of the prior data. In one implementation, the server may first determine the CTR at an individual document level, then at the source level, then at the section level, than for all sections throughout the data in that category, etc. until the server determines a CTR using reliable data.

As time passes, and as measured data is created with exploration, the server combines the measured data from the exploration results into the CTR estimation with a weight increasing by the number of data experiments. At block 320, the server determines whether there is sufficient measured data from exploration. The server can use a threshold (e.g., number of experiments) that is specified in configuration data in a data store to determine whether there is sufficient measured data. If there is not sufficient measured data (block 320), the server returns to block 317 to continue exploration. At block 319, the server can determine another estimate for the CTR using the combination of prior data and measured data. The server can use an average or median of the prior CTR and the measured CTR as the CTR for the recommendation with a weight of the measured data increased by its reliability. For example, the server can gradually merge the data for the prior CTR and the measured CTR, and can place a weight on the measured data increasing in proportion to the number of served impressions for the recommendation until the CTR for the recommendation is only using the measured data.

FIG. 4 illustrates an example of determining CTR for recommendations, according to various implementations. The exploration group 411 is a group of recommendations that may be newly added to the recommendation system. For example, the server may determine that Recommendation-5 429 and Recommendation-6 431 are new recommendations that have not yet been served. The non-exploration group 409 is a group of recommendations that have measured data. For example, the server may determine that Recommendation-5 429 and Recommendation-6 431 are new recommendations that have not yet been served and may include Recommendation-5 429 and Recommendation-6 431 in the exploration group 411. The server may determine that Recommendation-1 421, Recommendation-2 423, Recommendation-1 425, and Recommendation-2 427 are recommendations that have measured data and may include them in the non-exploration group 409.

The CTR 413 for Recommendation-5 429 and Recommendation-6 431 is unknown. As time passes, and as the server performs exploration to create measured data for Recommendation-5 429 and Recommendation-6 431, the server may determine a value for the CTR 450 for Recommendation-5 429 and Recommendation-6 431. For example, the server may determine that Recommendation-5 429 has a CTR of 2% and that Recommendation-6 431 has a CTR of 3%.

Returning to FIG. 3, if there is sufficient measured data (block 320), the server determines the grade for the recommendation using the CTR at block 321. When the server determines there is sufficient measured data, the server can use only the measured data for estimating the CTR for the recommendation. The server may use the estimated CTR from the measured data to determine the grade for the recommendation. The server can determine the grade for the recommendation as the RPM (revenue per mille) to a power j.

$$\text{Grade} = \text{RPM}^j \qquad \text{Equation 1}$$

The power j can represent a control factor for content providers to control the type of content recommendations that should be served. For example, the server can serve content recommendations that produce high revenue for a content provider. In another example, the server can serve content recommendations that are more varied. A lower value for the control factor indicates that a larger variety of content recommendations will be served. A higher value for the control factor indicates that more high revenue producing content recommendations will be served.

The control factor can be a configurable value. The control factor can be determined based on input from a content provider. For example, SportsNews, Inc. may indicate that they would like a variety of content recommendations to be served. In another example, SportsNews, Inc. may indicate that they would like content recommendations that produce the most revenue to be served.

The server can determine the RPM as the product of the CPC and CTR.

$$\text{RPM} = \text{CTR}^x \times \text{CPC}^y \qquad \text{Equation 2}$$

In one implementation, factor x=1 and factor y=1. The factors x and y can be configurable values to represent weights assigned to the CTR and the CPC.

Figure 5:
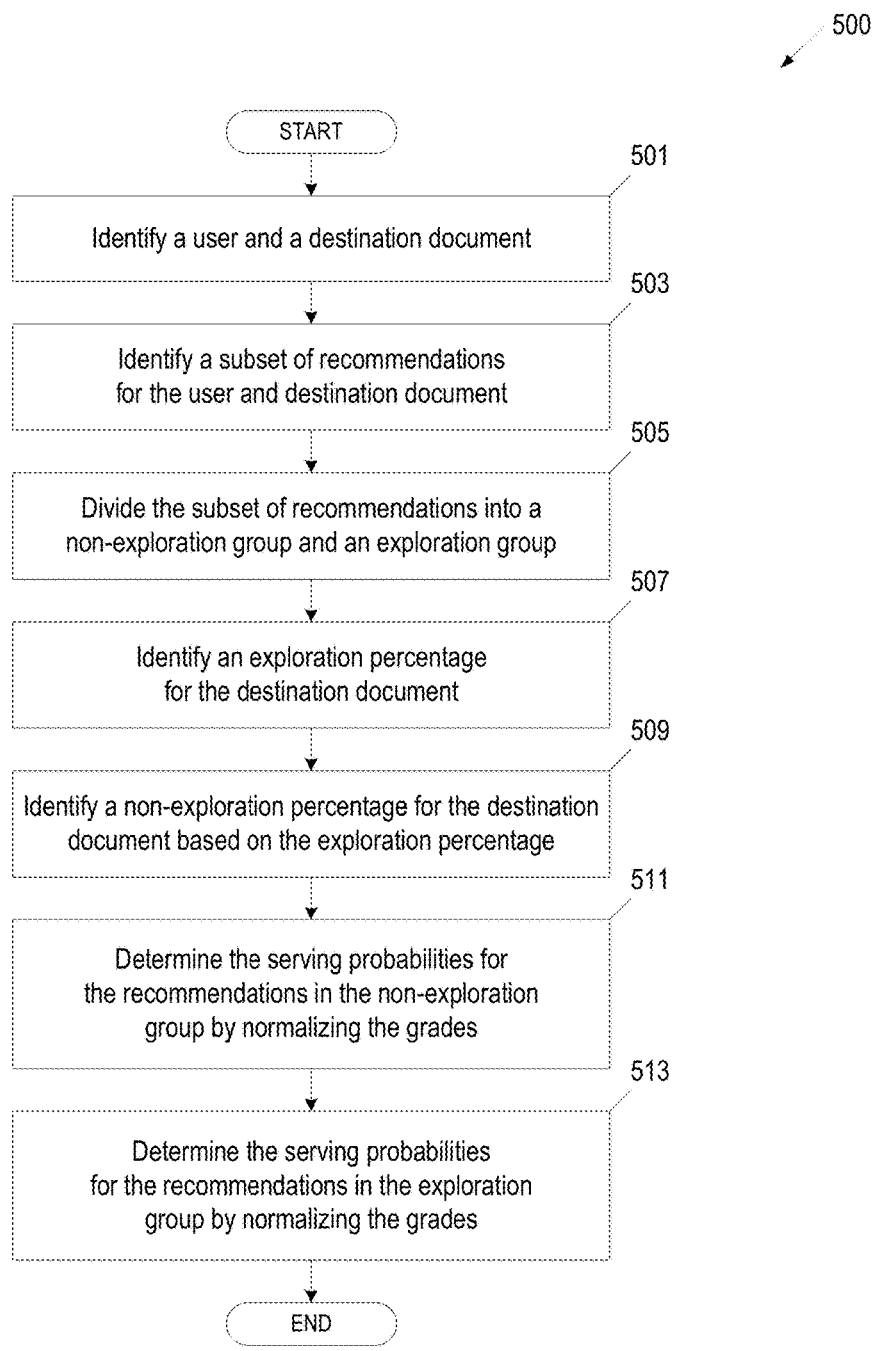
FIG. 5 is flow diagram of an implementation of a method for determining serving probabilities for the recommendations.

FIG. 5 is flow diagram of an implementation of a method 500 for determining serving probabilities for the recommendations. The method may be performed by processing logic that may comprise hardware (circuitry, dedicated logic, etc.), software (such as is run on a general purpose computer system or a dedicated machine), or a combination of both. In one implementation, the method 500 may be performed by the grading and serving probability module 145 hosted in a server 140 of FIG. 1.

At block 501, the server identifies a user and a destination document. At block 503, the server identifies a subset of recommendations. The subset of recommendations can represent recommendations that satisfy one or more fetching algorithms (e.g., contextual, behavioral, personal) and one or more filtering rules based on the destination document.

At block 505, the server divides the subset of recommendation into a non-exploration group and an exploration group. The non-exploration group can include recommendations that have a CTR value that is based on measured data for the corresponding recommendation. The exploration group can include recommendations that have a CTR value is based on data that is created by testing the corresponding recommendation in one or more destinations (e.g., documents, sources, etc.). The recommendations in the exploration group may have little or no measured data. For example, the recommendations in the exploration group may be new recommendations that have not been served as impressions for documents or have served as impression for a few times.

At block 507, the server identifies an exploration percentage for the destination document. The exploration percentage can represent the portion of the impressions for the destination document that is reserved for serving new content. For example, the destination document may be Document-X that is associated with Publisher-Y. Publisher-Y may have specified that recommendations that are to be served as impressions for Document-X should include a minimum of 10% new content. The server can be coupled to a data store that stores configuration data that defined the exploration percentages for the publishers. The configuration data can define the parameters that define new content. For example, new content can include recommendations that are no more than one day old.

At block 509, the server identifies a non-exploration percentage for the destination document based on the exploration percentage. For example, the server may identify the remaining percentage as the non-exploration percentage. For example, if the exploration percentage is 10%, the server can determine that the non-exploration percentage is 90%.

At block 511, the server determines the serving probabilities for the recommendations in the non-exploration group by normalizing the grades for the recommendations in the non-exploration group using the non-exploration percentage. At block 513, the server determines the serving probabilities for the recommendations in the exploration group by normalizing the grades for the recommendations in the exploration group using the exploration percentage.

FIG. 6 illustrates an example of determining serving probabilities for recommendations, according to various implementations. There can be multiple recommendation candidates. For simplicity and brevity six recommendation candidates 611,613,615,617,619,621,623 are shown.

$$\text{Grade} = RPM^j \qquad \text{Equation 1}$$

In one example, the control factor j=4, and the grade is:

$$\text{Grade} = RPM^4 \qquad \text{Statement 1}$$

The RPM can be calculated as follows:

$$RPM = CTR^x \times CPC^y \qquad \text{Equation 2}$$

In one example, the CTR factor x=1, and the CPC factor y=1, and the RPM may be:

$$RPM = CTR \times CPC \qquad \text{Statement 2}$$

The exploration group 609 may have an exploration percentage of 10%, which indicates that 10% of new recommendations should be served for a destination document. The non-exploration group 605 may have a non-exploration percentage of 90%, which indicates that 90% of recommendations that have measured data should be served for a destination document. The serving probabilities 620 for each recommendation can be a function of the grades normalized by the respective group 605,609 percentage. The serving probabilities 620 may be:

$$\left(\frac{\text{Grade}}{\text{Sum of Grades in Group}}\right) \times (\text{Group Percentage}) \qquad \text{Equation 3}$$

For example, for Recommendation-1 613

$$\left(\frac{0.0016^4}{0.0016^4 + 0.0010^4 + 0.0008^4 + 0.0030^4}\right) \times (0.90) \qquad \text{Statement 3}$$

Figure 7:
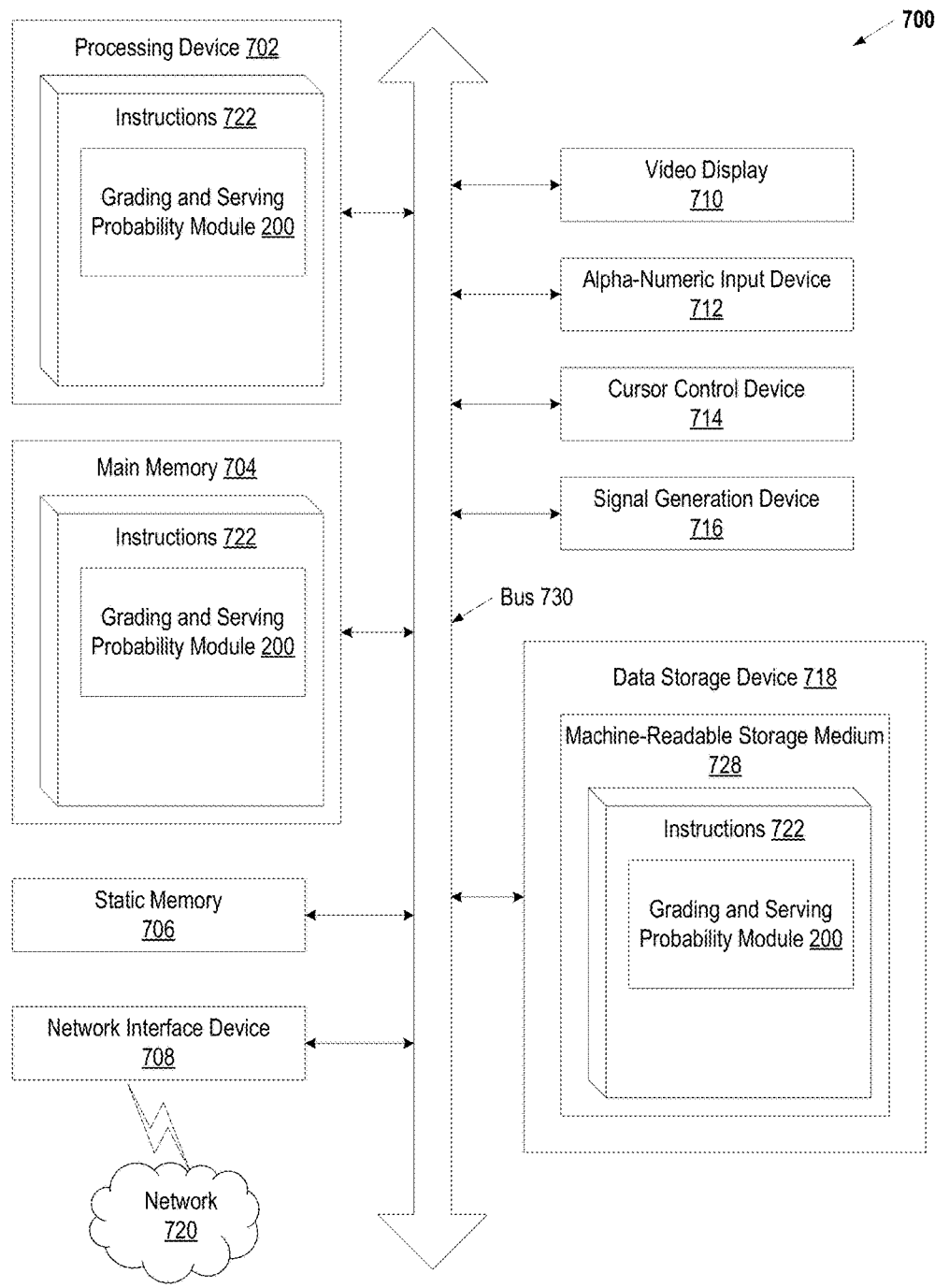
FIG. 7 is a block diagram of an example computer system that may perform one or more of the operations described herein, in accordance with various implementations.

FIG. 7 is a block diagram of an example computer system 700 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 714, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 may further include a network interface device 704. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 714 may include a computer-readable storage medium 724 on which is stored one or more sets of instructions 722 (e.g., software) embodying any one or more of the methodologies or functions described herein. The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 720 via the network interface device 708.

In one implementation, the instructions 722 include instructions for a grading and serving probability module (e.g., grading and serving probability 145 in FIG. 1) and/or a software library containing methods that call the grading and serving probability module. While the computer-readable storage medium 728 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "providing", "serving", "creating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of an intermediary system from a user system associated with a user, a selection of a filter to control collection of user information associated with a social network system;
   collecting, by the intermediary system, the user information in accordance with the filter; identifying, by the intermediary system in an offline mode, a first recommendation provisioned by a first content provider system, the first recommendation corresponding to the user information collected from the social network system and related to at least a portion of content of a first destination document served by a publisher system;

identifying, by the intermediary system, a second recommendation provisioned by a second content provider system, the second recommendation corresponding to the user information and the first destination document;

calculating, by the intermediary system, a first projected click-through-rate associated with the first recommendation based on the user information and the first destination document;

determining, by the intermediary system, a number of user experiences associated with the first projected click-through-rate is below a first threshold value;

obtaining, by the intermediary system, stored data associated with a performance of the first recommendation at a second destination document;

determining, by the intermediary system, an updated click-through-rate for the first recommendation based on the stored data;

generating, by the intermediary system, a first grade for the first recommendation based on the updated click-through-rate for the first recommendation;

generating, by the intermediary system, a second grade for the second recommendation based on at least one of the user or the first destination document;

receiving, by the intermediary system from the publisher system associated with the first destination document, an exploration percentage of a total number of impressions for the first destination document reserved for serving recommendations from an exploration group;

categorizing, by the intermediary system, the first recommendation into the exploration group associated with the exploration percentage designated by the publisher system;

categorizing, by the intermediary system, the second recommendation into a nonexploration group associated with a non-exploration percentage representing a second target percentage of the total number of impressions for the first destination document reserved for serving recommendations from the non-exploration group;

determining, by the intermediary system, a first serving probability for the first recommendation based at least in part on the first grade normalized by the exploration percentage;

determining, by the intermediary system in response to a user device associated with the user accessing the first destination document subsequent to the server identifying the first recommendation corresponding to the user in the offline mode, a second serving probability for the second recommendation based on the second grade normalized by the non-exploration percentage;

identifying, by the intermediary system, the first recommendation to serve to the user in the first destination document in view of at least one filtering rule and a comparison of the first serving probability, the second serving probability, a plurality of serving probabilities corresponding to additional recommendations in the exploration group, and a plurality of serving probabilities corresponding to additional recommendations in the non-exploration group, wherein the at least one filtering rule comprises a first constraint selected by the publisher system, and wherein the first constraint indicates a maximum percentage of content associated with the first content provider that is to be served in the first destination document; and causing, by the intermediary system via a web page of the publisher system, an electronic display of the first recommendation as a portion of the first destination document.

2. The method of claim 1, wherein determining the second grade comprises:
   determining a second click-through-rate for the second recommendation;
   identifying a cost-per-click parameter for the second recommendation; and
   determining the second grade based on the second click-through-rate and the cost-per-click parameter.

3. The method of claim 1, further comprising identifying exploration data by:
   identifying a plurality of destination documents to serve the first recommendation; and
   serving the first recommendation to the plurality of destination documents.

4. The method of claim 3, wherein identifying the plurality of destination documents comprises:
   identifying at least one of a document, position, source, category or section of a related recommendation that is in a same category as the first recommendation.

5. A system comprising:
   a memory; and
   a processing device operatively coupled with the memory, the processing device to:
      receive, from a user system associated with a user, a selection of a filter to control collection of user information associated with a social network system;
      collect the user information in accordance with the filter;
      identify, in an offline mode, a first recommendation provisioned by a first content provider system, the first recommendation corresponding to the user information collected from the social network system and related to at least a portion of content of a first destination document served by a publisher system;
      identify a second recommendation provisioned by a second content provider system, the second recommendation corresponding to the user information and the first destination document;
      calculate a first projected click-through-rate associated with the first recommendation based on the user information and the first destination document;
      determine a number of user experiences associated with the first estimated click-through-rate is below a first threshold value;
      obtain stored data associated with a performance of the first recommendation at a second destination document;
      determine an updated click-through-rate for the first recommendation based on the stored data;
      generate a first grade for the first recommendation based on the updated click-through-rate for the first recommendation;
      generate a second grade for the second recommendation based on at least one of the user or the first destination document;
      receive, from the publisher system associated with the first destination document, an exploration percentage of a total number of impressions for the first destination document reserved for serving recommendations from an exploration group;
categorize the first recommendation into the exploration group associated with the exploration percentage designated by the publisher system;
categorize the second recommendation into a non-exploration group associated with a non-exploration percentage;
determine a first serving probability for the first recommendation based at least in part on the first grade normalized by the exploration percentage;
determine a second serving probability for the second recommendation based on the second grade normalized by the non-exploration percentage;
identify, in response to a user device associated with the user accessing the first destination document subsequent to the server identifying the first recommendation corresponding to the user in the offline mode, the first recommendation to serve to the user in the first destination document in view of at least one filtering rule and a comparison of the first serving probability, the second serving probability, a plurality of serving probabilities corresponding to additional recommendations in the exploration group, and a plurality of serving probabilities corresponding to additional recommendations in the non-exploration group, wherein the at least one filtering rule comprises a first constraint selected by the publisher system, and wherein the first constraint indicates a maximum percentage of content associated with the first content provider that is to be served in the first destination document; and
cause, via a web page of the publisher system, an electronic display of the first recommendation as a portion of the first destination document.

6. The system of claim 5, wherein to determine second grade comprises the processing device to:
determine a second click-through-rate for the second recommendation;
identify a cost-per-click parameter for the second recommendation; and
determine the second grade based on the second click-through-rate and the cost-per-click parameter.

7. The system of claim 5, the processing device to:
identify a plurality of destination documents to serve the first recommendation; and
serve the first recommendation to the plurality of destination documents.

8. The system of claim 7, the processing device to:
identify at least one of a document, position, source, category or section of a related recommendation that is in a same category as the first recommendation.

9. A non-transitory computer readable storage medium encoding instructions thereon that, in response to execution by a processing device, cause the processing device to:
receive, from a user system associated with a user, a selection of a filter to control collection of user information associated with a social network system;
collect the user information in accordance with the filter;
identify, in an offline mode, a first recommendation provisioned by a first content provider system, the first recommendation corresponding to the user information collected from the social network system and related to at least a portion of content of a first destination document served by a publisher system;
identify a second recommendation provisioned by a second content provider system, the second recommendation corresponding to the user information and the first destination document;
calculate a first projected click-through-rate associated with the first recommendation based on the user information and the first destination document;
determine a number of user experiences associated with the first estimated click-through-rate is below a first threshold value;
obtain stored data associated with a performance of the first recommendation at a second destination document;
determine an updated click-through-rate for the first recommendation based on the stored data;
generate a first grade for the first recommendation based on the updated click-through-rate for the first recommendation;
generate a second grade for the second recommendation based on at least one of the user or the first destination document;
receive, from the publisher system associated with the first destination document, an exploration percentage of a total number of impressions for the first destination document reserved for serving recommendations from an exploration group;
categorize the first recommendation into the exploration group associated with the exploration percentage designated by the publisher system;
categorize the second recommendation into a non-exploration group associated with a non-exploration percentage;
determine a first serving probability for the first recommendation based at least in part on the first grade normalized by the exploration percentage;
determine a second serving probability for the second recommendation based on the second grade normalized by the non-exploration percentage;
identify, in response to a user device associated with the user accessing the first destination document subsequent to the server identifying the first recommendation corresponding to the user in the offline mode, the first recommendation to serve to the user in the first destination document in view of at least one filtering rule and a comparison of the first serving probability, the second serving probability, a plurality of serving probabilities corresponding to additional recommendations in the exploration group, and a plurality of serving probabilities corresponding to additional recommendations in the non-exploration group, wherein the at least one filtering rule comprises a first constraint selected by the publisher system, and wherein the first constraint indicates a maximum percentage of content associated with the first content provider that is to be served in the first destination document; and
cause, via a web page of the publisher system, an electronic display of the first recommendation as a portion of the first destination document.

10. The non-transitory computer readable storage medium of claim 9, the processing device to:
determine a second click-through-rate for the second recommendation a plurality of click-through-rates for the plurality of recommendations;
identify a cost-per-click parameter for the second recommendation; and
determine the second grade based on the second click-through-rate and the cost-per-click parameter.

11. The non-transitory computer readable storage medium of claim 9, the processing device to:
 identify a plurality of destination documents to serve the first recommendation; and
 serve the first recommendation to the plurality of destination documents.

\* \* \* \* \*